(12) United States Patent
Hirano

(10) Patent No.: US 12,210,786 B2
(45) Date of Patent: Jan. 28, 2025

(54) IMAGE FORMING APPARATUS, CONTROL METHOD, MEDIUM, AND PRINTING SYSTEM THAT ENABLE DELETION OF INFORMATION REGARDING REGISTRATION OF THE IMAGE FORMING APPARATUS TO A CLOUD PRINT SERVICE

(71) Applicant: CANON KABUSHIKI KAISHA, Tokyo (JP)

(72) Inventor: Tsubasa Hirano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/467,156

(22) Filed: Sep. 14, 2023

(65) Prior Publication Data

US 2024/0152302 A1 May 9, 2024

(30) Foreign Application Priority Data

Nov. 8, 2022 (JP) .................................. 2022-179093

(51) Int. Cl.
*G06F 3/12* (2006.01)

(52) U.S. Cl.
CPC .......... *G06F 3/1236* (2013.01); *G06F 3/1203* (2013.01); *G06F 3/1287* (2013.01)

(58) Field of Classification Search
USPC ....................................................... 358/1.1
See application file for complete search history.

(56) References Cited

U.S. PATENT DOCUMENTS

| 8,675,234 B2 | 3/2014 | Sato | |
|---|---|---|---|
| 2017/0277481 A1* | 9/2017 | Sako | ..................... G06F 3/1287 |
| 2022/0308813 A1* | 9/2022 | Nakashima | ........... G06F 3/1268 |

FOREIGN PATENT DOCUMENTS

| JP | 2012133489 A | | 7/2012 |
|---|---|---|---|
| JP | 2016179609 A | * | 10/2016 |
| JP | 6500542 B2 | | 4/2019 |
| JP | 2020047244 A | | 3/2020 |

OTHER PUBLICATIONS

Extended European Search Report issued in European Appln. No. 23197292.8, mailed Feb. 23, 2024.

* cited by examiner

*Primary Examiner* — Jacky X Zheng
(74) *Attorney, Agent, or Firm* — ROSSI, KIMMS & McDOWELL LLP

(57) ABSTRACT

An image forming apparatus usable from a cloud print service by registering the image forming apparatus to the cloud print service. The image forming apparatus performs a deletion operation of information about the cloud print service in which the image forming apparatus is registered, the information being stored in the image forming apparatus, and outputs a notification prompting deletion of registration of the image forming apparatus from the cloud print service when deletion of the registered information about the cloud print service is executed by the deletion operation.

9 Claims, 8 Drawing Sheets

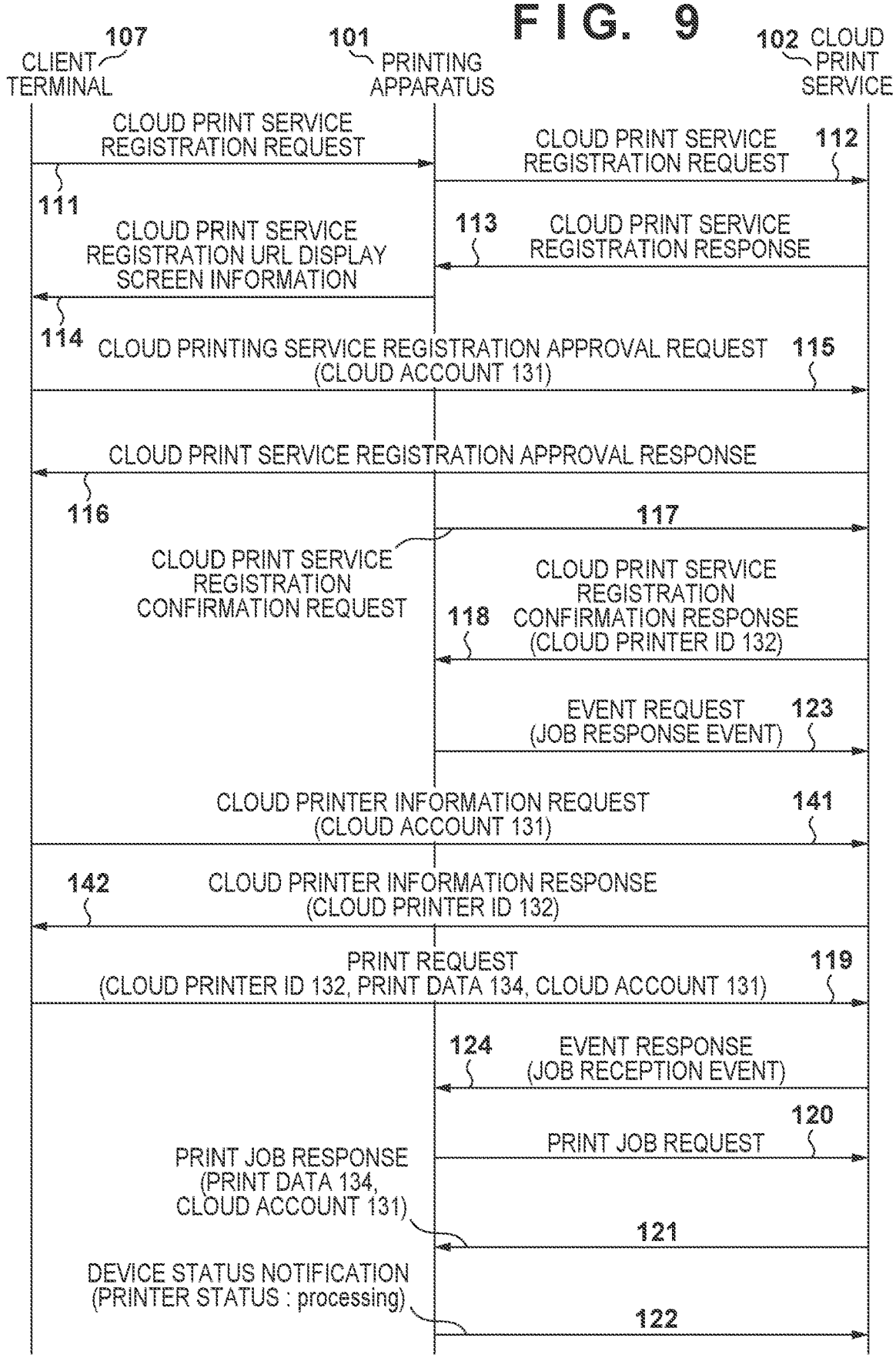

IMAGE FORMING APPARATUS, CONTROL METHOD, MEDIUM, AND PRINTING SYSTEM THAT ENABLE DELETION OF INFORMATION REGARDING REGISTRATION OF THE IMAGE FORMING APPARATUS TO A CLOUD PRINT SERVICE

BACKGROUND OF THE INVENTION

Field of the Invention

The present invention relates to an image forming apparatus, a control method, a medium, and a printing system.

Description of the Related Art

A cloud print mechanism that inputs a print job via a cloud server and transmits the print job to a printer (also referred to as a printing apparatus) is becoming widespread in use (Japanese Patent Laid-Open No. 2012-133489). In such a printing system, the administrator first registers a printer to a cloud print service (hereinafter, also referred to as CPS) to which the administrator belongs. By the registration, for example, information about the registered printer is stored in the CPS, and information about the CPS in which the printer is registered is stored in the printer. Thereafter, a user who is permitted to use the CPS selects a printer registered in the CPS as an output printer by using each client terminal, performs desired print setting, and transmits a print job to the CPS. Upon receiving the print job, the CPS transfers the print job to the printer. The printer executes printing based on the transferred print job. In particular, a cloud print mechanism using Internet Printer Protocol (IPP) is prescribed by PWG5100.18, RFC3995, RFC3996, and the like.

Note that the cloud print service (CPS) in the present specification refers to a service that can communicate with a client terminal and a printer using the Internet, receives a print request using the IPP, and provides a print job.

When the printer registered in the CPS is no longer used or the printer is to be re-registered, the user deletes the registration of the printer from the printer. Thereby, the information about the CPS stored in the printer is deleted. At this case, some CPSes may not include any means that allow notification to the CPS that the registration is deleted on the printer side. In such a system, it is necessary to delete the printer registration at each of the printer and the CPS.

If the registration is deleted on the printer side but the printer is still registered in the CPS, the user can instruct execution of printing using the printer from the client terminal. However, the printer side has canceled the registration of the CPS and does not perform communication for receiving a print instruction from the CPS, and the printer cannot actually perform printing, and thus user convenience is impaired. In addition, since the print job is not transferred to the printer, the print job stagnates in the CPS, which wastes resources of the CPS.

SUMMARY OF THE INVENTION

The present invention is to improve convenience and to suppress waste of resources by notifying that it is necessary to delete registration of an image forming apparatus in a cloud print service.

The present invention has the following configuration. According to an aspect of the present invention, there is provided: an image forming apparatus usable from a cloud print service by registering the image forming apparatus to the cloud print service, the image forming apparatus comprising at least one processor and at least one memory comprising at least one program, wherein the at least one program is configured to cause the at least one processor to perform a deletion operation of information about the cloud print service in which the image forming apparatus is registered, the information being stored in the image forming apparatus, and output a notification prompting deletion of registration of the image forming apparatus from the cloud print service when deletion of the registered information about the cloud print service is executed by the deletion operation.

According to another aspect of the present invention, there is provided: a printing system comprising: an image forming apparatus; and an information processing apparatus configured to provide a cloud print service using the image forming apparatus, wherein the image forming apparatus is usable from the cloud print service by registering the image forming apparatus to the cloud print service, the image forming apparatus comprises at least one processor and at least one memory comprising at least one program, and the at least one program is configured to cause the at least one processor to perform a deletion operation of information about the cloud print service in which the image forming apparatus is registered, the information being stored in the image forming apparatus, and output a notification prompting deletion of registration of the image forming apparatus from the cloud print service when deletion of the registered information about the cloud print service is executed by the deletion operation.

According to the present invention, it is possible to improve convenience and to suppress waste of resources by notifying that it is necessary to delete registration of the image forming apparatus in the cloud print service.

Further features of the present invention will become apparent from the following description of exemplary embodiments with reference to the attached drawings.

BRIEF DESCRIPTION OF THE DRAWINGS

FIG. 9 is a diagram illustrating an example of a sequence of registration and printing of a printing apparatus to a CPS.

DESCRIPTION OF THE EMBODIMENTS

Figure 1:
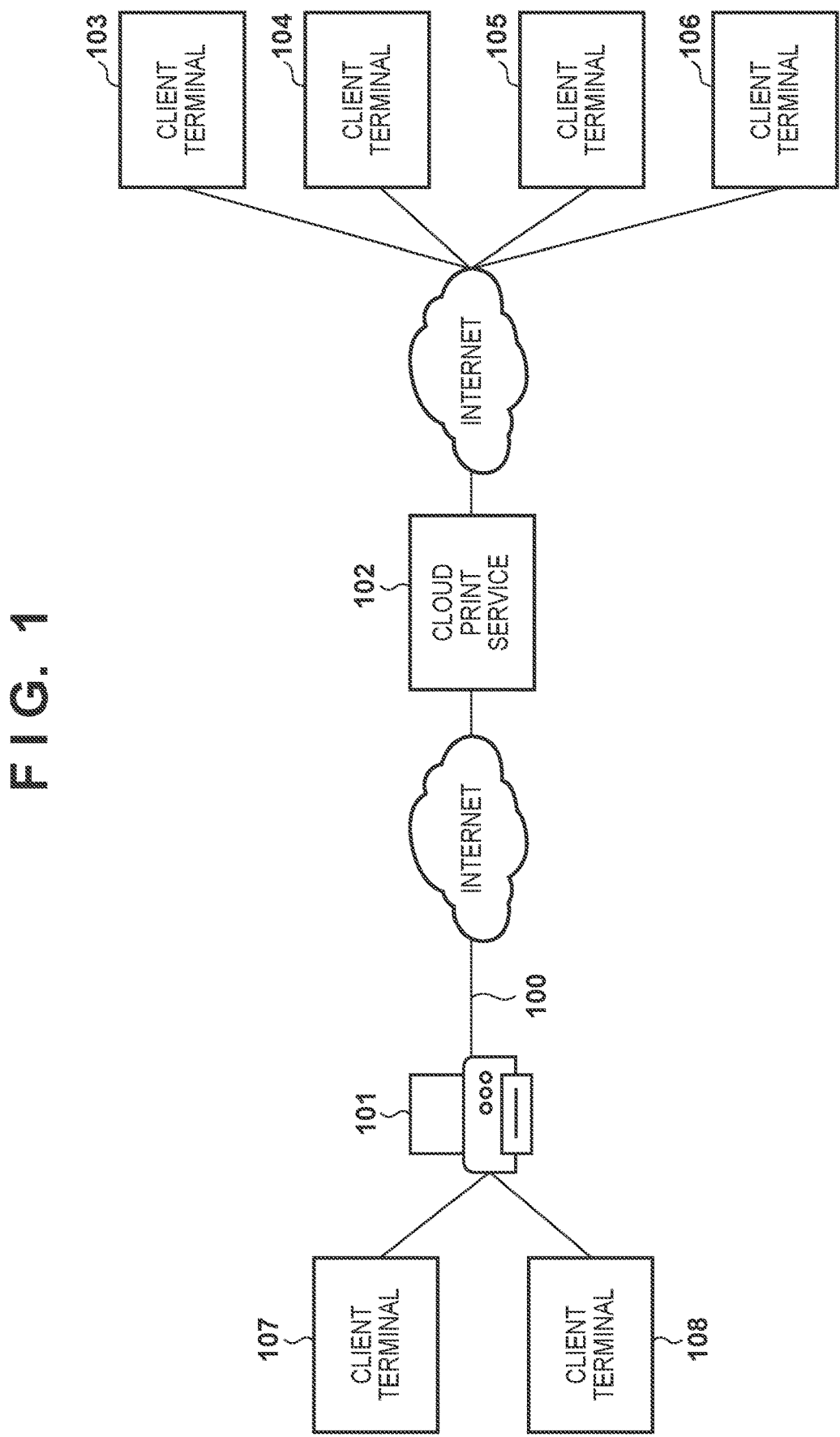
FIG. 1 is a configuration diagram of a printing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A configuration of the printing system according to the present invention will be described with reference to FIG. 1. The printing system according to the present embodiment includes a printing apparatus 101, client terminals 103 to 108, and a cloud print service (hereinafter, also referred to as a CPS) 102. The printing apparatus 101 communicates with, via a network 100, the CPS 102 on the Internet and the client terminals 107 and 108. The printing apparatus may also be referred to as a printer or an image forming apparatus. The client terminal may also be referred to as a terminal apparatus. The network 100 may be configured by combining, for example, a communication network such as a local area network (LAN) and a wide area network (WAN), a cellular network (such as LTE and 5G), and a wireless network conforming to IEEE802.11. That is, the network 100 only needs to be able to transmit and receive data, and any communication scheme may be adopted as the communication scheme of the physical layer. The client terminals 103 to 106 also communicate with the CPS 102 on the Internet via a communication network or a cellular network. The CPS 102 is provided by one or more server computers (i.e., information processing apparatuses), and receives a print request from a client terminal using, for example, the Internet Printing Protocol (IPP) and provides a print job to the printing apparatus 101.

The printing apparatus 101 has a scan function of externally transmitting data based on an image obtained by reading using a scanner, a print function of printing an image on a sheet such as paper based on a print job received from an external apparatus, and a copy function. The printing apparatus 101 can also receive a print job via the CPS 102 and perform printing. In the present embodiment, a multi function peripheral (MFP) having a plurality of functions is illustrated as an example of the printing apparatus, but the printing apparatus is not limited thereto. For example, a single function peripheral (SFP) having only a printing function may be used. In addition, in the present embodiment, printing on a sheet such as paper is illustrated as an example, but the present invention is not limited thereto, and can also be applied to print control in 3D printing or the like in which a three dimensional object is formed based on three dimensional shape data.

The CPS 102 receives a print job from a client terminal such as the client terminals 103 to 106 and stores the print job. Subsequently, the printing apparatus 101 registered in the CPS 102 is notified that the print job is input. Upon receiving the notification, the printing apparatus 101 acquires the print job and executes print processing. Here, a user of the CPS 102 belongs to a group called a tenant, and can perform, by using a client terminal, setting of the tenant, management and deletion of a printer.

The client terminals 103 to 106 are terminals that are used by the users. The client terminals belong to a network different from that of the printing apparatus 101 and can communicate with the CPS 102 through the Internet. By communicating with the CPS 102, these client terminals can register, to the terminals, a printer registered in the CPS 102, and can instruct printing. In addition, the client terminals can perform setting of a tenant of the CPS 102, management and deletion of a registered printer, and the like.

The client terminals 107 to 108 are terminals that are used by the users. These client terminals belong to the same network as that of the printing apparatus 101. By communicating with the printing apparatus 101, these client terminals can give a printing instruction to the printing apparatus 101. In addition, the client terminals can display a setting screen of the printing apparatus 101 by a function provided by the printing apparatus 101, and remotely perform operation setting of the printing apparatus 101. Further, the client terminals can communicate with the CPS 102 through the Internet. By communicating with the CPS 102, these client terminals can register, to the terminals, a printer registered in the CPS 102, and can instruct printing. In addition, the client terminals can perform setting of a tenant of the CPS 102, management and deletion of a registered printer, and the like.

<Hardware Configuration of Printing Apparatus 101>

Figure 2:
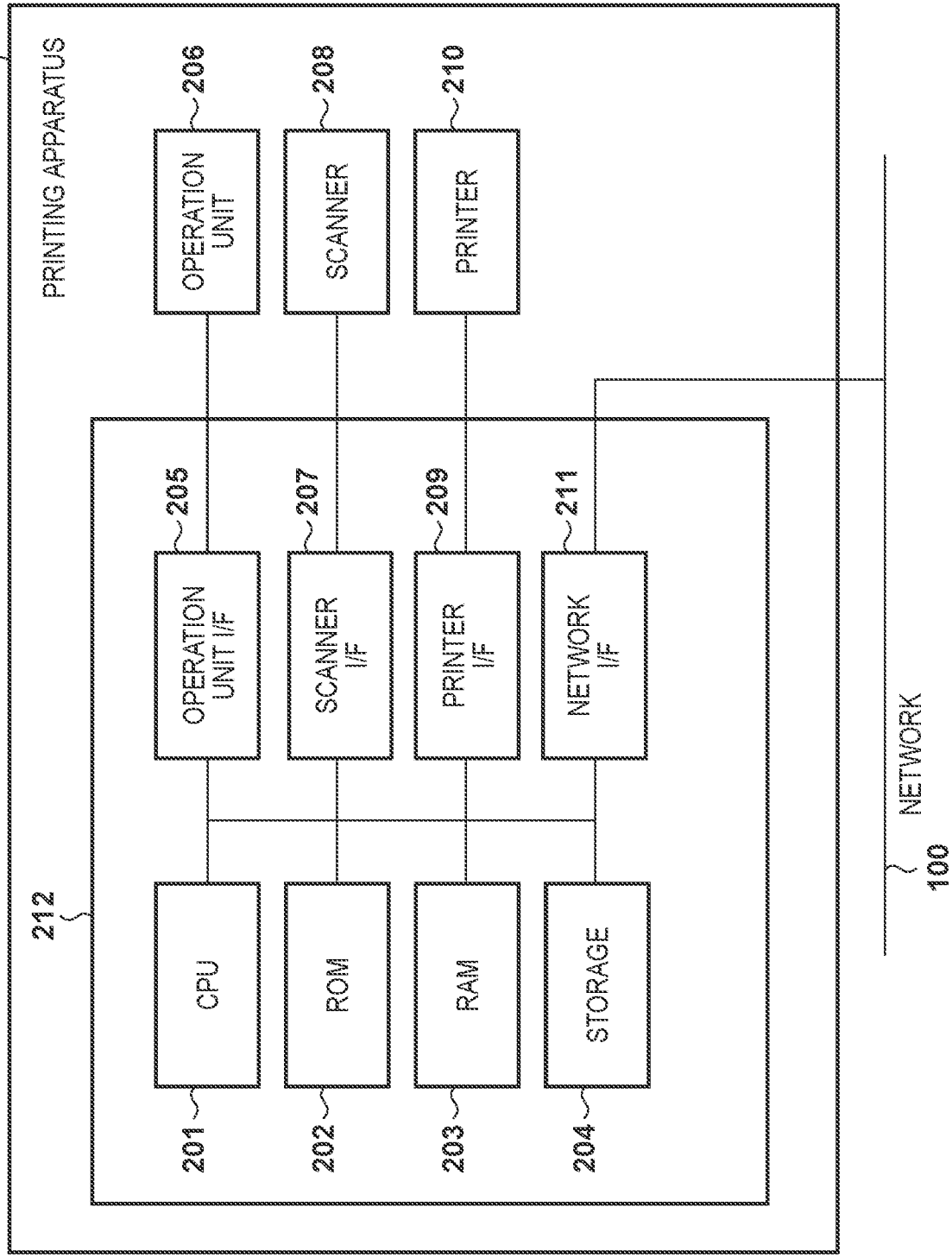
FIG. 2 is a hardware configuration diagram of a printing apparatus.

A hardware configuration of the printing apparatus 101 according to the present embodiment will be described with reference to FIG. 2. FIG. 2 is a block diagram illustrating a hardware configuration of the printing apparatus 101. The printing apparatus 101 has a reading function of reading an image on a sheet, a file transmission function that can transmit the read image to an external communication apparatus, and the like. In addition, the printing apparatus also has a print function of printing an image on a sheet. Further, the printing apparatus has functions of receiving a print job from the CPS 102 and printing the print job.

A controller 212 including a central processing unit (CPU) 201 controls overall operations of the printing apparatus 101. The CPU 201 controls overall operations of the printing apparatus 101. The CPU 201 reads out a control program stored in a read-only memory (ROM) 202 or a storage 204 to perform various types of controls such as print control and reading control. The ROM 202 stores a control program that can be executed by the CPU 201. A random access memory (RAM) 203 is a main memory that is accessed by the CPU 201, and is used as a work area or a temporary storage area for deploying various control programs. The storage 204 stores print jobs, image data, various programs, and various pieces of setting information. As described above, hardware such as the CPU 201, the ROM 202, the RAM 203, the storage 204 and the like form together a so-called computer.

Note that, in the printing apparatus 101 of the present embodiment, it is assumed that one CPU 201 executes each processing illustrated in a flowchart described below by using one memory (RAM 203), but another aspect may also be employed. For example, the respective processing illustrated in the flowchart described below can also be executed by causing a plurality of processors, memories, and storages to cooperate each other. Further, a part of the processing may be executed using a hardware circuit.

An operation unit I/F 205 connects an operation unit 206 and the controller 212. The operation unit 206 includes a liquid crystal display unit having a touch panel function, various hardware keys, and the like. The operation unit 206 functions as a display unit that displays information to a user, and a reception unit that receives an instruction from a user. The CPU 201 performs, in cooperation with the operation unit 206, display control of information and reception control of a user operation.

A scanner I/F 207 connects a scanner 208 and the controller 212. The scanner 208 reads a document placed on a platen (not illustrated), and generates image data. The image data generated by the scanner 208 is printed by a printer 210, stored in the storage 204, or transmitted to an external apparatus via the network I/F 211.

A printer I/F 209 connects the printer 210 and the controller 212. The printer 210 performs printing based on image data received via the network I/F 211 and printing based on image data generated by scanning a document with the scanner 208.

The network I/F 211 is connected to a network cable, and can execute communication with an external apparatus on the network 100 or the Internet. In the present embodiment, it is assumed that the network I/F 211 is a communication interface that performs wired communication conforming to Ethernet (trade name), but the present invention is not limited thereto. For example, the network I/F may be a wireless communication interface conforming to IEEE802.11 series. Alternatively, both may be wireless communication interfaces. In addition, the network I/F may be a communication interface that performs mobile communication such as a 3G line such as CDMA, a 4G line such as LTE, or 5G NR. It is also possible to connect to a client terminal via the network I/F 211 and use the client terminal as a user interface (remote UI).

In the present embodiment, a case where the printing apparatus 101 manages a database for managing user accounts is exemplified, but the present invention is not limited thereto. Management of a user account of a user who uses the printing apparatus 101 can also be realized in cooperation with an external authentication server. For example, user accounts may be managed in cooperation with an ActiveDirectory service provided by Microsoft (trade name) or an Azure (trade name) ActiveDirectory service.

Registration Sequence of Cloud Print

Now, a processing sequence of cloud print will be described using FIG. 9. The printing apparatus 101 supports a cloud print function and a WebUI (also referred to as a remote UI) function for operating the printing apparatus 101. In FIG. 9, the client terminal 107 supports not only a WebUI client for operating a WebUI but also a cloud print client function indicated by the client terminals 103 to 106 in FIG. 1. The WebUI function is, for example, a function in which the printing apparatus 101 functions as an HTTP server and provides a user interface (UI) of the printing apparatus 101 to an HTTP client (a WebUI client, for example, a web browser) of the client terminal 107. In addition, the cloud print service 102 represents a cloud print service on the Internet.

First, the user uses the WebUI client of the client terminal 107 to transmit a cloud print service registration request 111 to the printing apparatus 101 via the WebUI. Upon receiving the request 111, the printing apparatus 101 transmits a cloud print service registration request 112 to the cloud print service 102. Upon receiving the request 112, the cloud print service 102 transmits, to the printing apparatus 101, a cloud print service registration request response 113 including a registration URL 130 for cloud print registration. Upon receiving the response 113, the printing apparatus 101 transmits, to the client terminal 107 via the WebUI, registration URL display screen information 114 including the cloud print service registration URL.

Upon receiving the screen information 114, the client terminal 107 displays the registration URL on the WebUI client. The user operates the WebUI client of the client terminal 107 to access the displayed registration URL. Thereby, the client terminal 107 transmits a cloud print service registration approval request 115 including a cloud account 131 to the cloud print service 102.

Upon receiving the registration approval request 115, the cloud print service 102 transmits a cloud print service registration approval response 116 to the client terminal 107. The cloud account 131 indicates a user who has authority to use the cloud print service 102, and the user has registered a user account in the cloud print service 102 in advance.

The printing apparatus 101 transmits a cloud print service registration confirmation request 117 to the cloud print service 102. Upon receiving the registration confirmation request 117, the cloud print service 102 transmits a cloud print service registration confirmation response 118 including a cloud printer ID 132 to the printing apparatus 101. At this stage, the printing apparatus 101 is in a state of being registered in the cloud print service 102 and is ready to use the cloud print service. At this time, both the printing apparatus 101 and the CPS 102 store information or the like for associating them with each other.

Print Sequence of Cloud Print

Upon completion of registration in the above-described sequence, the printing apparatus 101 transmits an event request 123 to the cloud print service 102. In the event request 123, a job reception event is designated as a type of the requested event.

The client terminal 107 transmits a cloud printer information request 141 to the cloud print service 102. The cloud printer information request 141 includes a cloud account 131. Upon receiving the cloud printer information request 141, the cloud print service 102 acquires printer information that can be used by the cloud account 131 included in the cloud printer information request 141. Then, the cloud print service 102 transmits a cloud printer information response 142 storing the cloud printer ID 132 indicating the printer information to the client terminal 107.

The client terminal 107 transmits, to the cloud print service 102, a print request 119 including, for example, the cloud printer ID 132 selected by the user from available printing apparatuses, the print data 134 to be printed, and the cloud account 131. It is here assumed that the cloud printer ID 132 includes an ID of the printing apparatus 101. Upon receiving the print request 119, the cloud print service 102 stores the information received together with the print request 119, e.g., the cloud printer ID 132, the print data 134, and the cloud account 131. In addition, the cloud print service 102 transmits an event response 124 to the printing apparatus 101 that is a transmission source of the event request. The event response 124 is a message that is transmitted as a response to the event request 123, and a job reception event is designated as a type of event.

Upon receiving the event response 124, the printing apparatus 101 transmits a print job request 120 to the cloud print service 102. The cloud print service 102 transmits a print job response 121 including the print data 134 and the cloud account 131 to the printing apparatus 101. The printing apparatus 101 prints the received print data.

When a state of the printing apparatus changes, the printing apparatus 101 transmits a device state notification 122 to the cloud print service 102. In the present sequence, when the printing apparatus starts printing, the state of the printing apparatus changes from an idle state (standby state) to a processing state (in-processing state). Therefore, "processing" is set in the printer state notified by the device state notification 122. Note that the device state notification may also be referred to as a device information notification.

Upon receiving the device state notification 122, the cloud print service 102 transmits, to the printing apparatus 101, a response (for example, a code 200) indicating transmission success when the device state notification is normally received. In addition, the cloud print service 102 stores the notified device state in association with the printing apparatus 101 that is a transmission source. On the other hand, for example, if the corresponding printing apparatus is not registered, "IPP 407 error: client error gone", for example, is transmitted to the transmission source of the device state notification 122.

According to the above-described sequence, the printing apparatus 101 is registered in the CPS 102, and printing can be performed using the registered printing apparatus 101 from the client terminal.

First Embodiment

Next, with reference to FIGS. 3A to 3D and FIG. 4, a description will be given of a message display prompting CPS registration deletion in the printing apparatus and printer deletion in the CPS, according to the present embodiment.

Figure 3A:
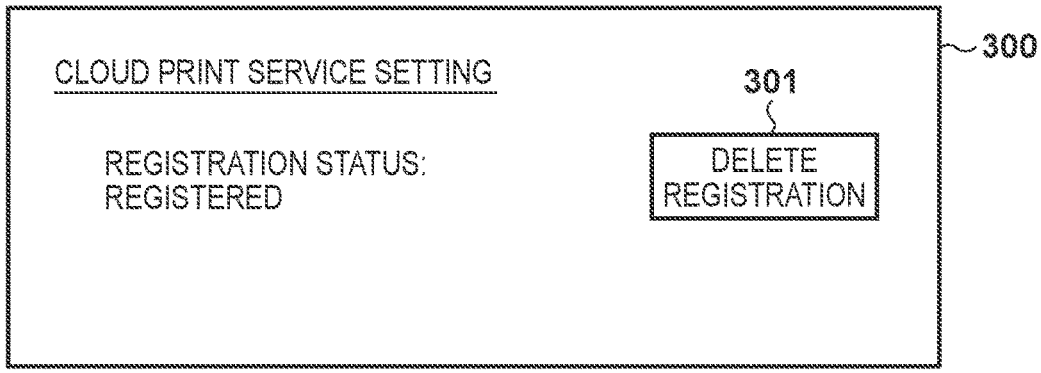
FIGS. 3A to 3D are diagrams illustrating an example of a cloud print service setting screen of the printing apparatus.
Figure 3B:
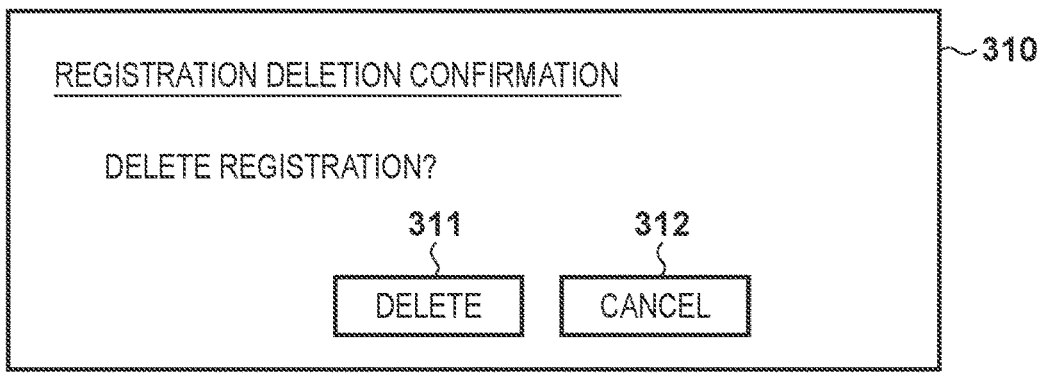
Figure 3C:
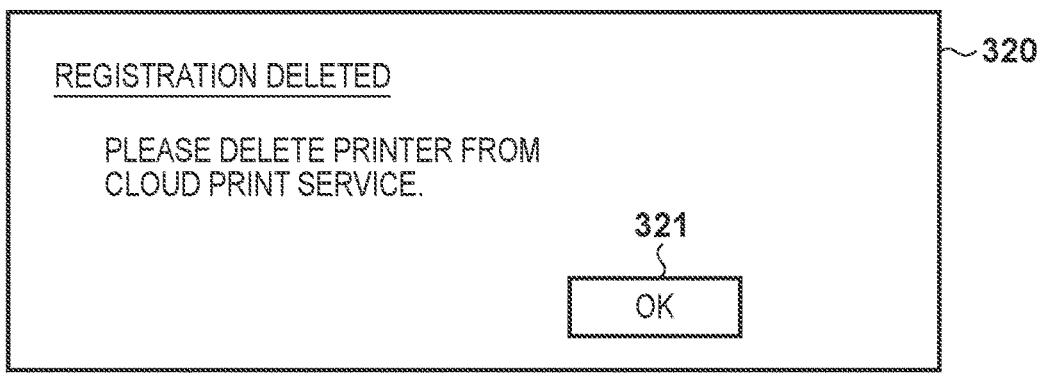

FIGS. 3A to 3D are an example of a cloud print service setting screen. These screens (300, 310, 320, 330) are displayed at the time of cloud print service setting and at the time of registration deletion. These setting screens are displayed on the operation unit 206 of the printing apparatus 101. Alternatively, these setting screens are displayed on the remote UI by accessing, from a client terminal, a setting screen provided by the printing apparatus 101 by using a network function such as hypertext transfer protocol (HTTP). FIG. 4 is a flowchart illustrating an operation of performing CPS registration deletion when a registration deletion button is pressed on a cloud print service setting screen 300 (FIG. 3A).

In the present embodiment, the printing apparatus 101 has been registered in the CPS 102 by the user, and registration information to the CPS 102 is stored in the storage 204 of the printing apparatus 101. The registration information includes a registration status indicating whether registration to the CPS 102 has been completed or is being performed, certification information for performing encrypted communication between the CPS 102 and the printing apparatus 101, and authentication information indicating that the printing apparatus 101 is a registered printer. In addition, the CPS 102 also stores printer information about the printing apparatus 101.

First, when the user opens a CPS setting screen, the printing apparatus 101 displays a CPS setting screen 300 (FIG. 3A). This screen displays a registration status of the printing apparatus to the CPS and a registration deletion button 301. When the user presses the "registration deletion" button 301, a registration deletion operation is started and the processing proceeds to S401. In S401, a registration deletion confirmation screen 310 (FIG. 3B) is displayed, and pressing of either a "delete" button 311 or a "cancel" button 312 is awaited. When either button is pressed, the processing proceeds to S402, and it is determined which button is pressed.

When the "delete" button is pressed, a registration deletion completion screen 320 (FIG. 3C) prompting the user to perform a printer registration deletion operation even in the CPS 102 is displayed (S403). When an "OK" button 321 is pressed on the registration deletion completion screen 320, the CPS registration information stored in the storage 204 of the printing apparatus 101 is deleted (S404). Thereafter, a cloud print service setting screen 330 (FIG. 3D) is displayed (S405). On this screen, since the CPS registration information has been deleted, "unregistered" is displayed as the registration status, and a "registration" button 331 for new registration with the CPS is displayed.

On the other hand, if it is determined that the "cancel" button is pressed in S402, the registration information deletion is not performed and the CPS setting screen is displayed (S405). At this time, since the printing apparatus 101 remains in a state of being registered in the CPS, the screen 300 indicating the registered state is displayed.

By the above-described operation, the user can be notified of the necessity of the registration deletion even in the CPS 102 when the CPS registration deletion is performed in the printing apparatus 101, and can notice the necessity. And when the user performs the printer registration deletion in the CPS 102, printing using the printer that cannot be used by the client terminal is disabled, leading to a reduction in unnecessary communication and a reduction in data stored in the CPS 102.

On the other hand, even when the operation and processing according to the present embodiment are performed, the setting of the printing apparatus is not changed. For example, in the case where the printing apparatus has a setting whether to use cloud print or a setting whether to use IPP, these settings are not changed even when the printer registration deletion is performed.

In the present embodiment, the deletion (S404) of the CPS registration information is performed after the screen prompting the user to perform the printer registration deletion operation in the CPS is displayed (S403), but the order may be reversed. That is, after the deletion (S404) of the CPS registration information is performed, the screen prompting the user to perform the printer registration deletion operation in the CPS may be displayed (S403).

Second Embodiment

Figure 5:
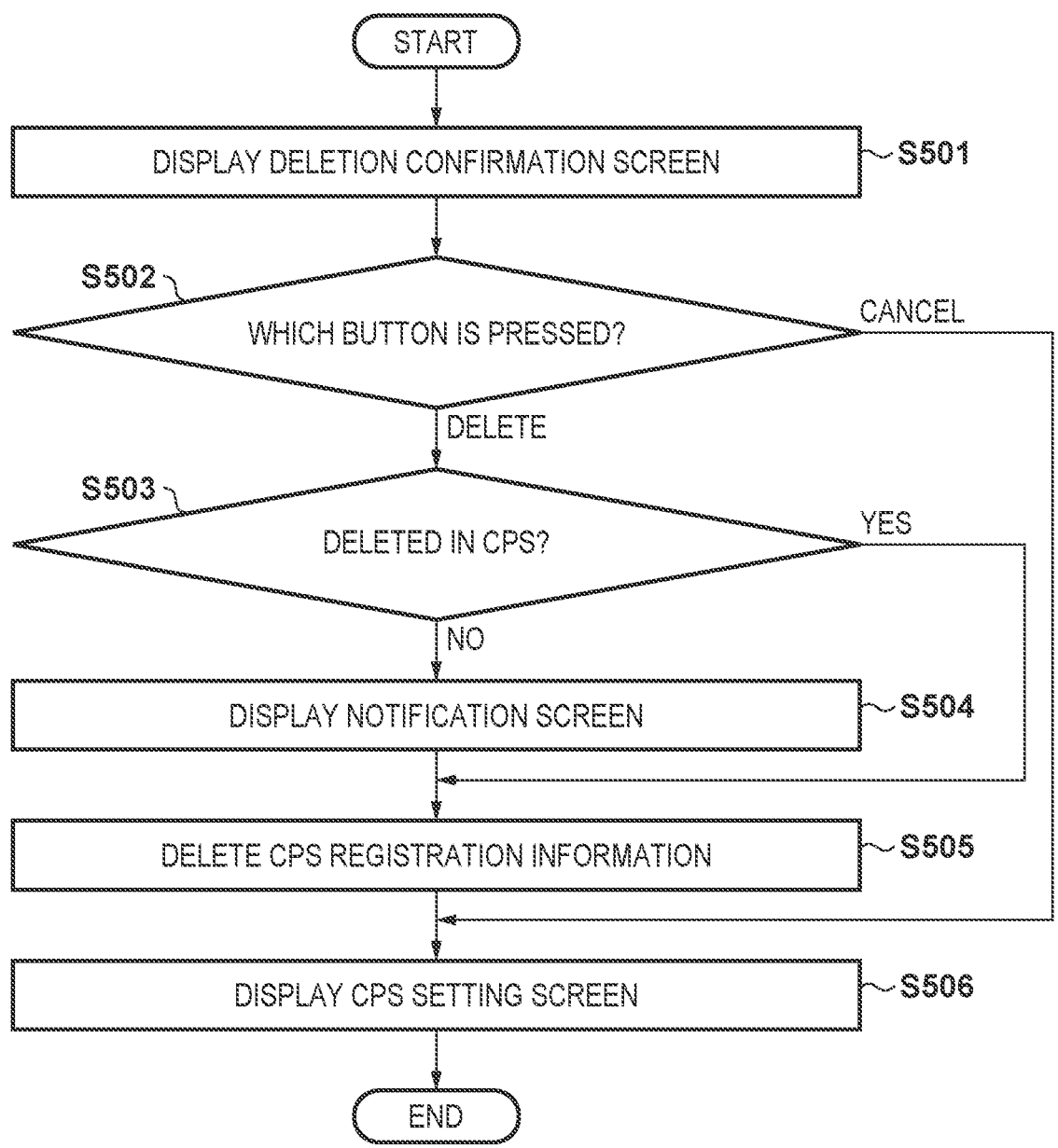
FIG. 5 is a flowchart of a CPS registration deletion operation in the printing apparatus according to a second embodiment.

Subsequently, a second embodiment of the present invention will be described. FIG. 5 is a flowchart illustrating an operation of performing CPS registration deletion when a registration deletion button is pressed on the cloud print service setting screen 300 in the present embodiment.

Similarly to the first embodiment, also in the present embodiment, the printing apparatus 101 has been registered in the CPS 102 by the user, and the registration information to the CPS 102 is stored in the storage 204 of the printing apparatus 101. The registration information includes a registration status indicating whether registration to the CPS 102 has been completed or is being performed, certification information for performing encrypted communication between the CPS 102 and the printing apparatus 101, and authentication information indicating that the printing apparatus 101 is a registered printer. In addition, the CPS 102 also stores printer information about the printing apparatus 101.

First, when the user opens the CPS setting screen, the printing apparatus 101 displays the cloud print service setting screen 300. This screen displays a registration status of the printing apparatus to the CPS and the registration deletion button 301. When the user presses the "registration deletion" button 301, a registration deletion operation is started and the processing proceeds to the S501. In S501, the registration deletion confirmation screen 310 is displayed, and pressing of either the "delete" button 311 or the "cancel" button 312 is awaited. When either button is pressed, the processing proceeds to S502, and it is determined which button is pressed. When the "delete" button is pressed, the processing proceeds to S503, and it is determined whether registration of a printer corresponding to the printing apparatus 101 is deleted in the CPS 102.

Here, as a method of determining whether the registration is deleted, the determination can be made by confirming a result of communication with the CPS 102. For example, the printing apparatus 101 can transmit a printer information notification request (Update-Output-Device-Attributes) to the CPS 102 by using the IPP protocol. This request includes identification information indicating a target printer and information indicating a state of the printing apparatus 101, and the printing apparatus 101 requests to update the information about the printing apparatus 101 on the CPS 102 by transmitting the request. By confirming a response to the request, it is determined whether the registration of the printer is deleted in the CPS 102.

If the printer is in a state of being registered in the CPS 102, the CPS 102 transmits, to the printing apparatus 101, a response including a value (e.g., success-ok) indicating that processing could be normally performed. On the other hand, when the target printer is deleted in the CPS 102, the CPS 102 transmits, to the printing apparatus 101, a response including a value (client-error-gone or the like) indicating that the target printer does not exist. When the printing apparatus 101 receives a value indicating that processing could be normally performed, it can be determined that the printer is not deleted in the CPS 102. When a response including a value indicating that no printer exists is received, it can be determined that the printer is deleted in the CPS 102.

The printing apparatus 101 may store previous responses to communications with the CPS 102 and may make a determination from the responses. Alternatively, communication may be performed when the "delete" button is pressed, and determination may be made from a response thereto. Alternatively, the determination may be made by a response received in response to other than the printer information notification request. In addition, when the screen of the printing apparatus 101 is displayed on the client terminal, the result information about the previous communication response with the CPS 102, which is necessary for this step, is necessary. As a method of acquiring this information, the information is acquired by communicating with the printing apparatus 101 after proceeding to S503. Alternatively, when the cloud print service setting screen 300 is displayed at the start of this flow, the printing apparatus 101 may transmit result information together with data for displaying the screen, and this information may be used for the determination in S503.

When it is determined in S503 that the printer is not deleted (S503: NO), a screen 320 prompting the user to perform a printer registration deletion operation even in the CPS is displayed (S504). And when the "OK" button 321 is pressed on the screen 320, the CPS registration information stored in the storage 204 of the printing apparatus 101 is deleted (S505).

On the other hand, when it is determined in S503 that the printer is deleted in the CPS (S503: YES), the screen 320 is not displayed, and the CPS registration information stored in the storage 204 of the printing apparatus 101 is deleted (S505). After S505, the cloud print service setting screen 330 is displayed (S506). On this screen, since the CPS registration information has been deleted, "unregistered" is displayed as the registration status, and the "registration" button 331 for new registration with the CPS is displayed.

On the other hand, when it is determined in S502 that the "cancel" button is pressed, the registration information deletion is not performed and the CPS setting screen is displayed (S506). At this time, since the printing apparatus 101 remains in a state of being registered in the CPS, the screen 300 indicating the registered state is displayed, and the present flow ends.

By the above-described operation, when the CPS registration deletion is performed in the printing apparatus 101, the user can notice that the registration deletion needs to be performed even in the CPS 102. And when the printer registration deletion is performed in the CPS 102, printing using the printer that cannot be used by the client terminal is disabled, leading to a reduction in unnecessary communication and a reduction in data stored in the CPS 102.

On the other hand, as in the first embodiment, even when the operation and processing according to the present embodiment are performed, the setting of the printing apparatus is not changed. For example, in the case where the printing apparatus has a setting whether to use cloud print or a setting whether to use IPP, these settings are not changed even when the printer registration deletion is performed.

Third Embodiment

Figure 6:
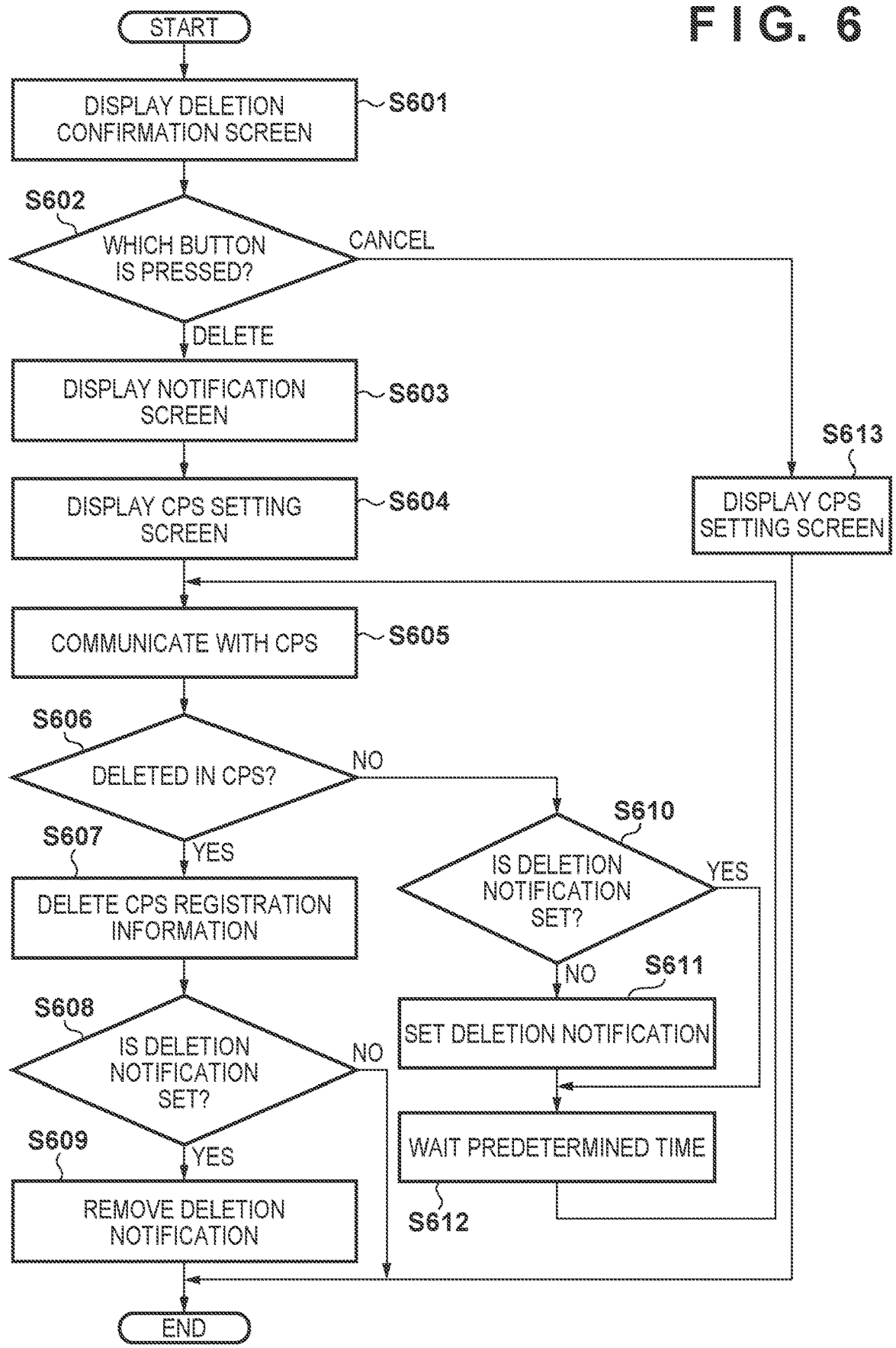
FIG. 6 is a flowchart of a CPS registration deletion operation in the printing apparatus according to a third embodiment.
Figure 7A:
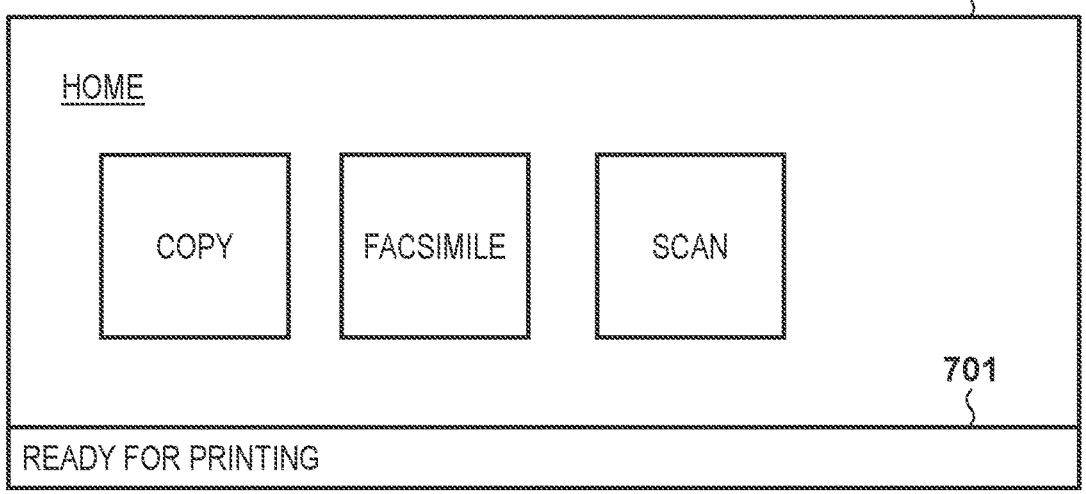
FIGS. 7A and 7B are diagrams illustrating an example of a notification display in the printing apparatus according to the third embodiment.
Figure 7B:
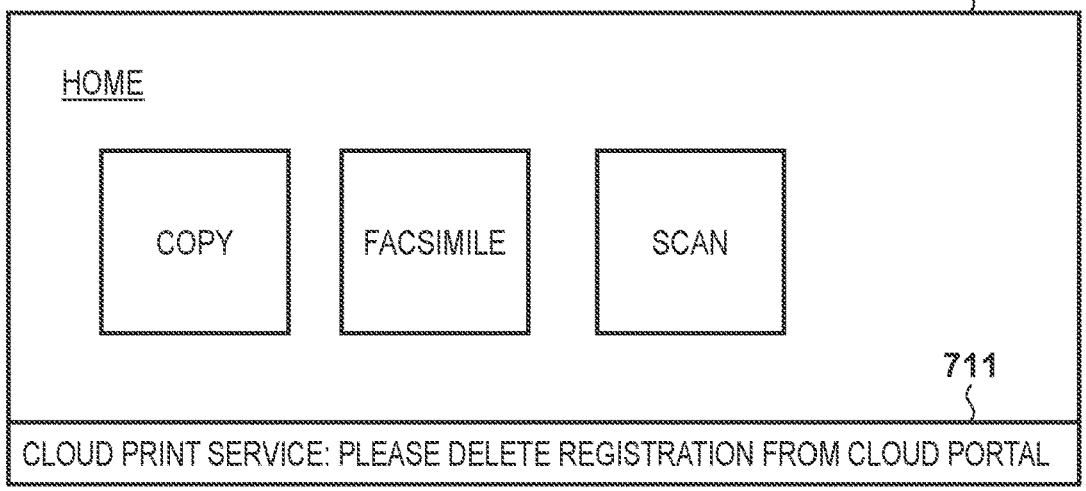

Next, with reference to FIGS. 6, 7A and 7B, a description will be given of a method of displaying, on a setting screen of the printing apparatus, which prompts deletion of a printer on the CPS, after CPS registration of the printing apparatus according to the present invention is deleted, and before deletion of the printer on the CPS is performed.

In the present embodiment, the printing apparatus 101 has been registered in the CPS 102 by the user, and registration information with the CPS 102 is stored in the storage 204 of the printing apparatus 101. The registration information includes a registration status indicating whether registration to the CPS 102 has been completed or is being performed, certification information for performing encrypted communication between the CPS 102 and the printing apparatus 101, and authentication information indicating that the printing apparatus 101 is a registered printer. In addition, the CPS 102 also stores printer information about the printing apparatus 101.

As in the first embodiment, the CPS setting screens 300, 310, 320 and 330 are displayed on the operation unit 206 of the printing apparatus. Alternatively, these setting screens are displayed by accessing, from a client terminal 107, a setting screen provided by the printing apparatus by using a network function such as hypertext transfer protocol (HTTP).

First, when the user opens the CPS setting screen, the printing apparatus 101 displays the CPS setting screen 300. This screen displays a registration status of the printing apparatus to the CPS and the registration deletion button 301. When the user presses the "registration deletion" button 301, the registration deletion operation is started and the processing proceeds to the S601.

In S601, the registration deletion confirmation screen 310 is displayed, and pressing of either the "delete" button 311 or the "cancel" button 312 is awaited. When either button is pressed, the processing proceeds to S602, and it is determined which button is pressed. When it is determined in S602 that the "cancel" button is pressed, the registration information deletion is not performed and the CPS setting screen is displayed (S613). At this time, since the printing apparatus 101 remains in a state of being registered in the CPS, the screen 300 indicating the registered state is displayed. This flow is then terminated. When the "delete"

button is pressed in S602, a screen 320 prompting the user to perform a printer registration deletion operation even in the CPS is displayed (S603).

After S603, when the "OK" button 321 is pressed on the screen 320, the cloud print service setting screen 330 is displayed (S604). On this screen, since the registration deletion operation has been performed, "unregistered" is displayed as the registration status, and the "registration" button 331 for new registration with the CPS is displayed. In addition, this is the end of the registration deletion operation that is performed on the printing apparatus by the user, and thereafter, the user can perform an operation of displaying another screen or the like.

After S604, the printing apparatus 101 communicates with the CPS 102 in S605 and confirms whether the registration of a printer corresponding to the printing apparatus 101 is deleted in the CPS 102. Here, as a method of determining whether the registration is deleted, the determination can be made by confirming a result of communication with the CPS 102, as in the second embodiment. For example, the printing apparatus 101 can transmit a printer information notification request (Update-Output-Device-Attributes) to the CPS 102 by using the IPP protocol. Thereafter, in S606, the communication result in S605, for example, a response from CPS 102 is confirmed, and it is determined whether the printer is deleted in the CPS 102. When the printing apparatus 101 receives a response including a value indicating that no printer exists, it can be determined that the printer is deleted in the CPS 102.

When it is determined in S606 that the printer is not deleted in the CPS 102, the processing proceeds to S610 to check whether a deletion notification is set. When a deletion notification is set, the processing proceeds to S612. If not, the processing proceeds to S611, and the printing apparatus 101 sets a deletion notification notifying that the printer needs to be deleted from the cloud print service. Thereafter, in S612, the elapse of a predetermined time is awaited. Then, the processing proceeds to S605 again to communicate with the CPS and check whether the printer is deleted in the CPS.

On the other hand, when it is determined that the printer is deleted in the CPS 102 by checking the communication result in S606, the processing proceeds to S607. In S607, the CPS registration information stored in the storage 204 of the printing apparatus 101 is deleted. Thereafter, in S608, it is confirmed whether a deletion notification is set. When a deletion notification is set, the processing proceeds to S609 to remove the deletion notification, and this flow is terminated. When a deletion notification is not set, this flow is terminated, as it is.

Here, the screen display when the deletion notification is set will be described. FIGS. 7A and 7B are illustrating home screens 700 and 710 that are displayed by the operation unit 206 of the printing apparatus 101. The home screen is a basic screen that is displayed when the printing apparatus 101 is activated and on standby, and includes a notification part 701 or 711 at a lower portion of the screen. When the deletion notification is not set, the home screen is displayed as the screen 700. A sentence such as "Ready for printing" indicating that the printing apparatus 101 is in an idle state is displayed in the notification part 701. On the other hand, when the deletion notification is set, the home screen is displayed as the screen 710. At this time, a sentence notifying that the printer needs to be deleted from the cloud print service is displayed on the notification part 711.

Figure 8:
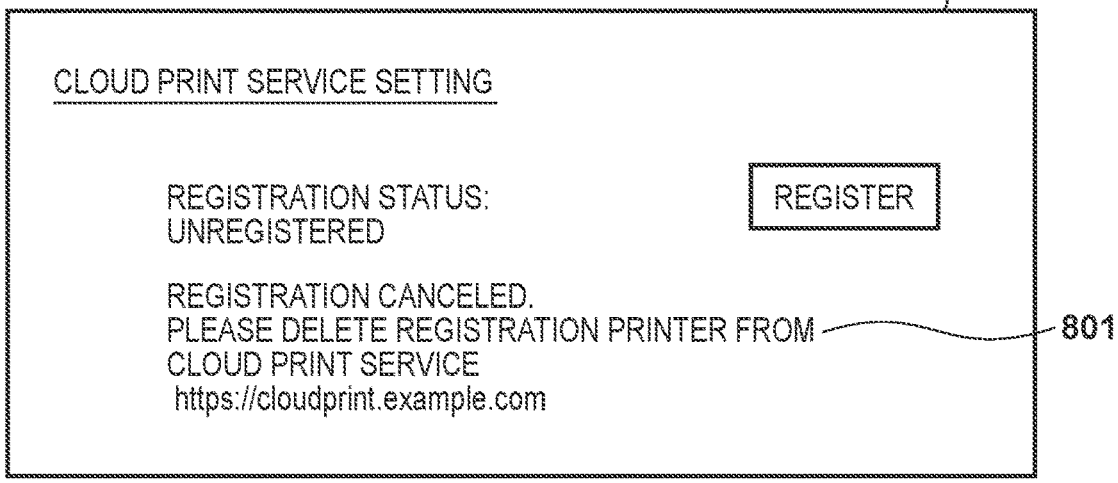
FIG. 8 is a diagram illustrating an example of a notification display on the cloud print service setting screen of the printing apparatus according to the third embodiment.

In addition, the notification may also be displayed on a cloud print service setting screen other than the home screen. FIG. 8 illustrates an example of the cloud print service setting screen when the deletion notification is set. This screen may be displayed on the operation unit 206 of the printing apparatus 101 or by accessing, from the client terminal, a setting screen provided by the printing apparatus 101 by HTTP or the like. A screen 800 displays a message 801. In the message 801, a sentence indicating that it is necessary to delete the printer from the cloud print service is displayed. The Web browser of the client terminal can display a URL to a Web site of the CPS for deleting the registered printing apparatus, in addition to the sentence prompting the user to delete the registration of the printing apparatus from the CPS. In the example of FIG. 8, the URL "https://cloudprint.example.com" is described as the URL of the top page of the CPS 102. When the printing apparatus 101 stores or can create a URL that allows access to a setting screen of a specific printer in the CPS 102, such a URL or a link to the screen may be displayed. For example, a URL such as "https://cloudprint.example.com/example_tenant/printer/72d42a71-97d6-461d-9087-88563efddb23" may be displayed.

Figure 3D:
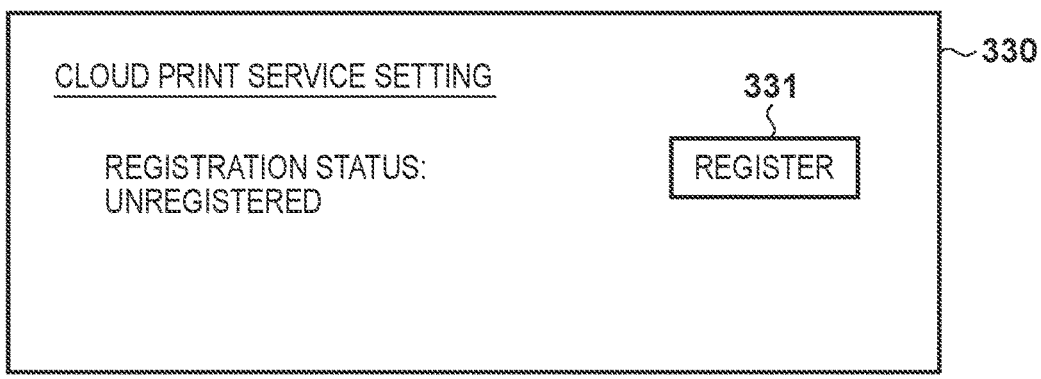
Figure 4:
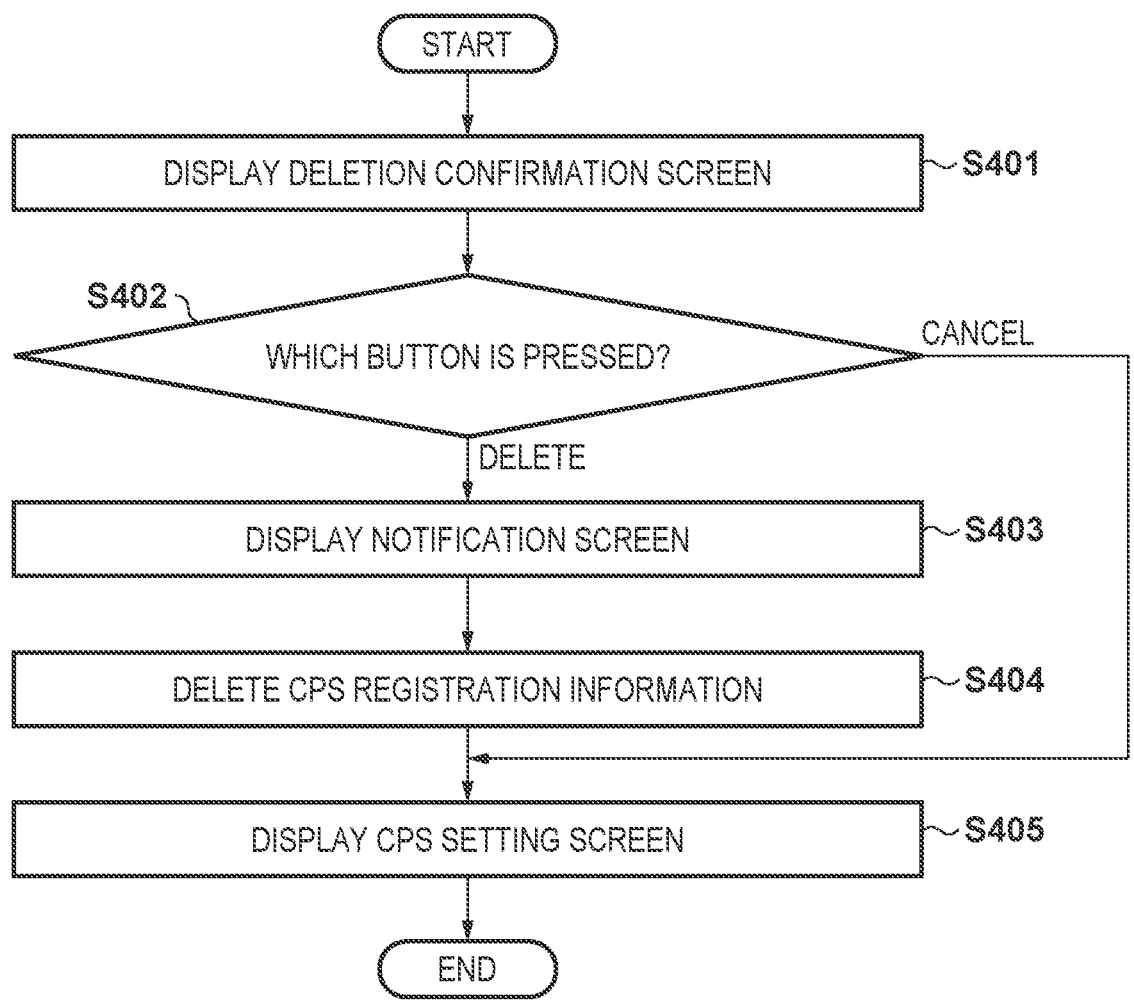
FIG. 4 is a flowchart of a CPS registration deletion operation in the printing apparatus according to a first embodiment.

In a case where the cloud print service setting screen of the printing apparatus 101 is displayed, when the deletion notification is not set, the screen 330 of FIG. 3D is displayed, and when the deletion notification is set, the screen 800 is displayed. Thereby, it is possible to notify the user that the printer deletion is required in the CPS, only when the printer deletion is not performed in the CPS.

The operation that is performed when the deletion notification is set is not limited to the description above, and a sentence or display to be notified may be performed on another screen. In addition, S608 and S610 may not be executed.

According to the above-described operation, when the CPS registration deletion is performed in the printing apparatus 101, it is possible to periodically confirm whether the registration of the printer is deleted from the CPS and continuously display the notification if the registration is not deleted. The notification can be displayed, for example, in a notification region always displayed on a screen such as a standby screen or on a cloud print service setting screen. Thereby, the user can notice that it is necessary to perform the registration deletion in the CPS 102. And when the user performs the printer registration deletion in the CPS 102, printing using the printer that cannot be used by the client terminal is disabled, leading to a reduction in unnecessary communication and a reduction in data stored in the CPS 102.

On the other hand, as in the first and second embodiments, even when the operation and processing according to the present embodiment are performed, the setting of the printing apparatus is not changed. For example, in the case where the printing apparatus has a setting whether to use cloud print or a setting whether to use IPP, these settings are not changed even when the printer registration deletion is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-179093, filed Nov. 8, 2022 which is hereby incorporated by reference herein in its entirety.

What is claimed is:

1. An image forming apparatus usable from a cloud print service by registering the image forming apparatus to the cloud print service, the image forming apparatus comprising:
   at least one memory storing at least one program; and
   at least one processor that executes the at least one program to:
      perform a deletion operation of deleting information about the cloud print service in which the image forming apparatus is registered, the information being stored in the image forming apparatus;
      determine whether the image forming apparatus is registered in the cloud print service;
      output a notification prompting deletion of registration of the image forming apparatus from the cloud print service, in a state where the deletion operation is performed and the image forming apparatus is determined to be registered in the cloud print service; and
      not output the notification, in a state where the image forming apparatus is determined to be not registered in the cloud print service.

2. The image forming apparatus according to claim 1, wherein the at least one processor communicates with the cloud print service, and determines whether the image forming apparatus is registered is based on a response to the communication.

3. The image forming apparatus according to claim 1, wherein the at least one processor repeatedly determines whether the image forming apparatus is registered in the cloud print service while the deletion operation is being performed.

4. The image forming apparatus according to claim 3, wherein the repetition is periodic.

5. The image forming apparatus according to claim 1, further comprising:
   a display unit,
   wherein the notification is displayed by the display unit.

6. The image forming apparatus according to claim 1, wherein:
   the deletion operation provides a screen to a terminal apparatus connected by communication, and
   the notification is displayed on the screen by a display unit of the terminal apparatus.

7. A non-transitory computer-readable medium storing at least one program executable by a computer to execute a method comprising:
   performing a deletion operation of deleting information about a cloud print service in which an image forming apparatus is registered, the information being stored in the image forming apparatus; and
   determining whether the image forming apparatus is registered in the cloud print service;
   outputting a notification prompting deletion of registration of the image forming apparatus from the cloud print service, in a state where the deletion operation is performed and the determining determined that the image forming apparatus is registered in the cloud print service; and
   not outputting the notification, in a state where the determining determined that the image forming apparatus is not registered in the cloud print service.

8. A printing system comprising:
   an image forming apparatus usable from the cloud print service by registering the image forming apparatus to a cloud print service; and
   an information processing apparatus configured to provide the cloud print service using the image forming apparatus, and comprising:
      at least one memory storing at least one program; and
      at least one processor that executes the at least one program to:
         perform a deletion operation of deleting information about the cloud print service in which the image forming apparatus is registered, the information being stored in the image forming apparatus;
         determine whether the image forming apparatus is registered in the cloud print service;
         output a notification prompting deletion of registration of the image forming apparatus from the cloud print service in a state where the deletion operation is performed and the image forming apparatus is determined to be registered in the cloud print service; and
         not output the notification in a state where the image forming apparatus is determined to be not registered in the cloud print service.

9. A control method by an image forming apparatus comprising a deletion operation unit and a notification unit and being usable from a cloud print service by registering the image forming apparatus to the cloud print service, the control method comprising:
   performing, by the deletion operation unit, a deletion operation of deleting information about the cloud print service in which the image forming apparatus is registered, the information being stored in the image forming apparatus;
   determining whether the image forming apparatus is registered in the cloud print service; and
   outputting, by the notification unit, a notification prompting deletion of registration of the image forming apparatus from the cloud print service, in a state where the deletion operation is performed and the determining determines that the image forming apparatus is registered in the cloud print service; and not outputting the notification in a state where the determining determines that the image forming apparatus is not registered in the cloud print service.

\* \* \* \* \*